(12) United States Patent
Tanaka et al.

(10) Patent No.: US 7,324,756 B2
(45) Date of Patent: Jan. 29, 2008

(54) OPTICAL DEMULTIPLEXER AND OPTICAL TRANSMISSION SYSTEM

(75) Inventors: Masato Tanaka, Kanagawa (JP); Toshiaki Okuno, Kanagawa (JP); Fumiyoshi Ohkubo, Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 519 days.

(21) Appl. No.: 10/407,935

(22) Filed: Apr. 7, 2003

(65) Prior Publication Data
US 2003/0214980 A1 Nov. 20, 2003

(30) Foreign Application Priority Data
Apr. 8, 2002 (JP) ............................. 2002-105365

(51) Int. Cl.
*H04J 14/02* (2006.01)
(52) U.S. Cl. .......................................... 398/79; 398/82
(58) Field of Classification Search ................. 398/68, 398/69, 79, 82, 88
See application file for complete search history.

(56) References Cited

U.S. PATENT DOCUMENTS

| | | | |
|---|---|---|---|
| 5,410,624 A * | 4/1995 | Morkel ........................ | 385/24 |
| 5,589,969 A | 12/1996 | Taga et al. | |
| 5,841,557 A * | 11/1998 | Otsuka et al. ................ | 398/65 |
| 6,118,561 A * | 9/2000 | Maki ............................ | 398/1 |
| 6,118,563 A * | 9/2000 | Boskovic et al. ............. | 398/1 |
| 6,157,754 A * | 12/2000 | Sasaoka et al. ............... | 385/24 |
| 6,366,376 B1 * | 4/2002 | Miyata et al. ................. | 398/79 |
| 6,782,203 B2 * | 8/2004 | Lin et al. ..................... | 398/82 |
| 6,930,824 B1 * | 8/2005 | Ishikawa et al. ......... | 359/341.32 |
| 2001/0015836 A1 * | 8/2001 | Kim et al. .................. | 359/124 |

FOREIGN PATENT DOCUMENTS

| | | |
|---|---|---|
| JP | 7-264166 A | 10/1995 |
| JP | 8-211237 A | 8/1996 |
| JP | 08-256128 | 10/1996 |

(Continued)

OTHER PUBLICATIONS

Forghieri F et al, "Reduction Of Four-Wave Mixing Crosstalk In WDM Systems Using Unequally Space Channels", vol. 6, No. 6, Jun. 1994, pp. 754-756, XP000457239.

(Continued)

*Primary Examiner*—Dalzid Singh
(74) *Attorney, Agent, or Firm*—McDermott Will & Emery LLP

(57) ABSTRACT

It is an object of the present invention to provide an optical transmission system in which multiple optical frequencies can be efficiently used and the change of the system can be easily made, and to provide an optical demultiplexer suitable for such optical transmission system. In an optical demultiplexer according to the present invention, signal light having a plurality of wavelength components arranged on a grid having predetermined frequency intervals is input from an input port thereof to be demultiplexed. The demultiplexed signal lights output from the output ports thereof have a plurality of wavelength components, respectively, and any three wavelength components, $f_a$, $f_b$, and $f_d$, that satisfy the following conditions: $f_a < f_b < f_d$; and $f_d - f_a \leq N\Delta f$ have the following relationship: $2f_b \neq f_a + f_d$ where N represents an integer, and $\Delta f$ represents each of the predetermined frequency intervals.

14 Claims, 6 Drawing Sheets

FOREIGN PATENT DOCUMENTS

| | | |
|---|---|---|
| JP | 09-247091 | 9/1997 |
| JP | 11-154934 A | 6/1999 |

OTHER PUBLICATIONS

Jae-Seung Lee et al, "Periodic Allocation Of A Set Of Unequally Spaced Channels for WDM Systems Adopting Dispersion-Shifted Fibers", vol. 10, No. 6, Jun. 1998, XP011046088.

Fakui M et al, "Esperimental Verification Of Cascadability Of 12 Channel X 2.5 Gb/s WDM Add/drop Multiplexer Employing Unequally-spaced Arrayed-waveguide Grating", vol. 4, Sep. 15, 1996, pp. 103-106, XP010303172.

Lee S-S et al, "Enchancement Of Power Margin And Scalability In WDM Links Adopting Dispersion-Shifted Fibres Using Periodic-Unequally-Spaced-Channel Allocation", vol. 35, No. 14, Jul. 8, 1999, pp. 1176-1177, XP000939530.

Kyo Inoue, "Arrangement Of Orthogonal Polarized Signals For Suppressing Fiber Four-Wave Mixing In Optical Multichannel Transmission Systems", vol. 3, No. 6, Jun. 1, 1991, pp. 560-563, XP000227356.

European search Report dated Jun. 21, 2006.

Japanese Office Action issued in corresponding Japanese Patent Application No. 2002-105365, dated Feb. 6, 2007.

* cited by examiner

Optical frequency

OPTICAL DEMULTIPLEXER AND OPTICAL TRANSMISSION SYSTEM

BACKGROUND OF THE INVENTION

1. Field of the Invention

The present invention relates to an optical demultiplexer that demultiplexes signal light having a plurality of wavelength components and outputs from a plurality of output ports thereof, and to an optical transmission system including the optical demultiplexer.

2. Description of the Background Art

In an optical transmission system, by transmitting signal light through a transmission line made of an optical fiber, a large volume of information can be transmitted and received at high speed. Above all, in a wavelength division multiplexing (WDM) optical transmission system, signals (wavelength components) which have different wavelengths are multiplexed and transmitted through an optical fiber transmission line, whereby a greater capacity of information can be transmitted.

In this WDM optical transmission system, it is important to suppress the deterioration of the waveform of each signal transmitted through the optical fiber transmission line. The signal waveform deterioration in the WDM optical transmission system is mainly caused by the accumulated chromatic dispersion and nonlinear optical phenomena. In particular, when high density multiplexing is performed, it is essential to suppress signal-waveform deterioration caused by four-wave mixing, which is one of the nonlinear optical phenomena.

Japanese Patent Application Publication No. 9-247091 (corresponding to U.S. Pat. No. 6,366,376) discloses an invention intended to suppress the occurrence of four-wave mixing. In the disclosed optical transmission system, the arrangement of optical frequencies of the signals transmitted through the optical fiber transmission line is contrived so as to prevent the wavelength of four-wave mixed light generated on an optical fiber transmission line from being superimposed on the wavelengths of signals.

The above invention is suitable for use in a system including an optical demultiplexer. Specifically, in the case of optical transmission lines (e.g., optical transmission lines for an access system) connected to output ports of an optical demultiplexer, signal-waveform deterioration due to four-wave mixing can be suppressed by arranging the optical frequencies of signals as described in the above publication. In addition, even if a low-dispersion optical fiber is used for an optical transmission line, signal-waveform deterioration caused by four-wave mixing is suppressed, and in this case, the need for a dispersion compensator is eliminated, thus reducing the cost of the system.

SUMMARY OF THE INVENTION

It is an object of the present invention to provide an optical transmission system in which multiple optical frequencies can be efficiently used and the change of the system can be easily made, and to provide an optical demultiplexer suitable for such optical transmission system.

In an optical demultiplexer according to the present invention, signal light having a plurality of wavelength components arranged on a grid having predetermined frequency intervals is input from an input port thereof to be demultiplexed, and demultiplexed light is output from a plurality of output ports thereof. In the optical demultiplexer, the signal lights output from the output ports have a plurality of wavelength components, respectively, and any three wavelength components that satisfy the following conditions:

$f_a < f_b < f_d$; and $f_d - f_a \leq N\Delta f$ have the following relationship:

$2f_b \neq f_a + f_d$ where $f_a$, $f_b$, and $f_d$ represent the optical frequencies of the three wavelength components, respectively, N represents an integer, and $\Delta f$ represents each of the predetermined frequency intervals.

Alternatively, the signal lights output from the output ports have a plurality of wavelength components, respectively, and any four wavelength components that satisfy the following conditions:

$f_a < f_b < f_c < f_d$; and $f_d - f_a < N\Delta f$ have the following relationship:

$f_b + f_c \neq f_a + f_d$ where $f_a$, $f_b$, $f_c$, and $f_d$ represent the optical frequencies of the four wavelength components, respectively, N represents an integer, and $\Delta f$ represents each of the predetermined frequency intervals. The optical frequencies of the wavelength components in each of the output signal lights may be arranged periodically with a cycle of $N\Delta f$, where N represents an integer equal to or greater than 2. Among wavelength components in the input signal light, the polarization of any two wavelength components having adjacent optical frequencies is orthogonal to each other and among the wavelength components in the output signal lights, the polarization of any two wavelength components having adjacent optical frequencies is orthogonal to each other.

In addition, an optical transmission system is provided which includes an optical demultiplexer according to the present invention, an input-side optical transmission line connected to an input port of the optical demultiplexer; and output-side optical transmission lines respectively connected to output ports of the optical demultiplexer.

Preferably, the absolute value of chromatic dispersion in signal light wavelengths on each of the output-side optical transmission lines is equal to or less than 5 ps/nm/km. The optical transmission system may further include at least one optical amplifier for performing optical amplification on one of signal light which is input to the input port and signal light which is output from each of the output ports.

The present invention is further explained below by referring to the accompanying drawings. The drawings are provided solely for the purpose of illustration and are not intended to limit the scope of the invention.

DESCRIPTION OF THE PREFERRED EMBODIMENTS

Figure 1:
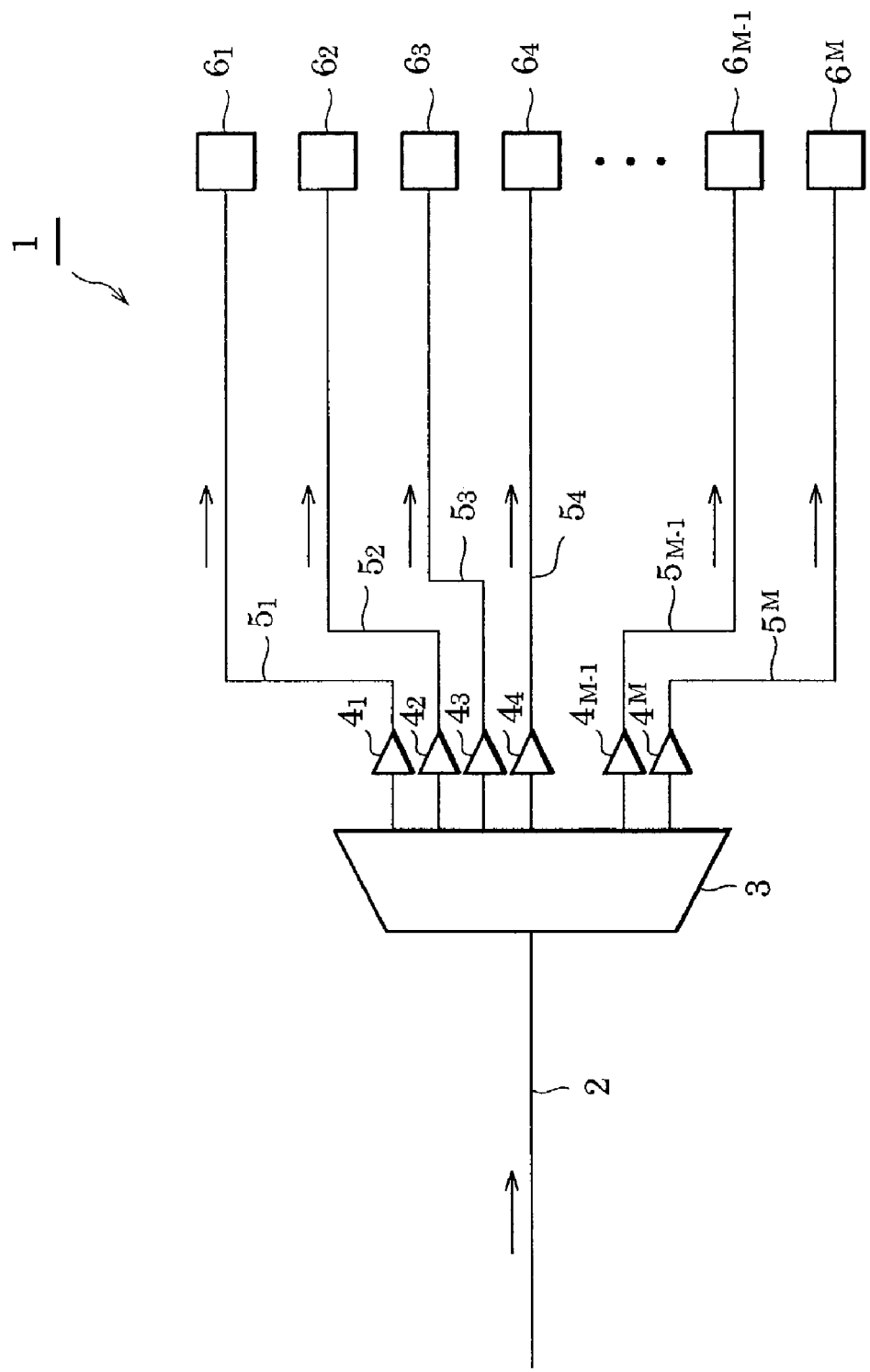
FIG. 1 is a block diagram showing an optical transmission system 1 according to an embodiment of the present invention.

Embodiments of the present invention are explained below by referring to the accompanying drawings. In the drawings, the same number refers to the same part to avoid duplicate explanation. The ratios of the dimensions in the drawings do not necessarily coincide with the explanation.

FIG. 1 is a block diagram showing an optical transmission system 1 according to an embodiment of the present invention. The optical transmission system 1 shown in FIG. 1 is a downlink system from a branch optical fiber line 2 up to user-side apparatuses 6 ($6_1$ to $6_M$). The optical transmission system 1 includes the optical fiber line 2, an optical demultiplexer 3, optical amplifiers $4_1$ to $4_M$, access-system optical-fiber transmission lines $5_1$ to $5_M$, and the user-side apparatuses $6_1$ to $6_M$. Here, the subscript M represents an integer equal to or greater than 2.

The optical fiber transmission line 2 transmits signal light having a plurality of wavelengths from a trunk line node (not shown) to branch nodes. The optical demultiplexer 3 and optical amplifiers $4_1$ to $4_M$ are provided at the branch nodes. The optical demultiplexer 3 has an input port. Signal light which has wavelength components and which is transmitted through the optical fiber transmission line 2 is input to the input port. The input signal light is demultiplexed and signal lights obtained by demultiplexing are output from any one output port to the optical amplifier $4_m$. The subscript m represents an integer which is not less than 1 and not greater than M. The optical amplifier $4_m$ optically amplifies signal light which is output from the optical demultiplexer 3, and sends the amplified signal light to an optical fiber transmission line $5_m$. The optical fiber transmission line $5_m$ is used to transmit, to the user-side apparatus $6_m$, the signal light sent from the optical amplifier $4_m$.

Figure 2A:
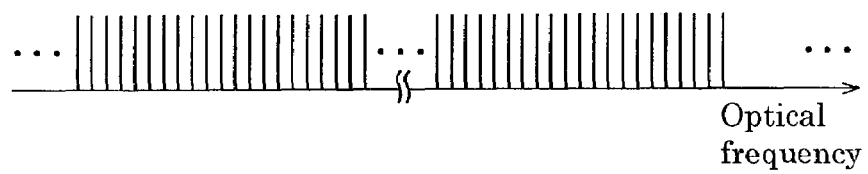
FIGS. 2A to 2D are graphs illustrating the optical frequencies of wavelength components in signal light which is transmitted through each optical fiber transmission line in the optical transmission system 1.
Figure 2B:
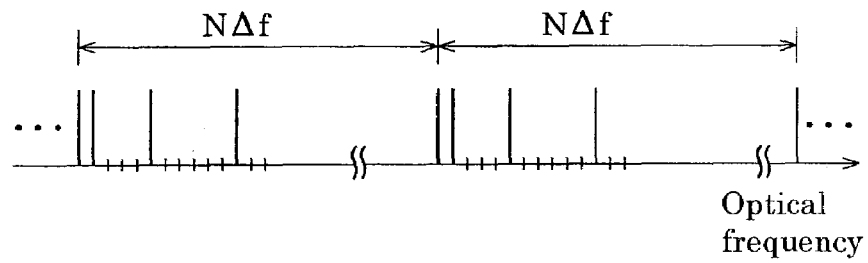
Figure 2C:
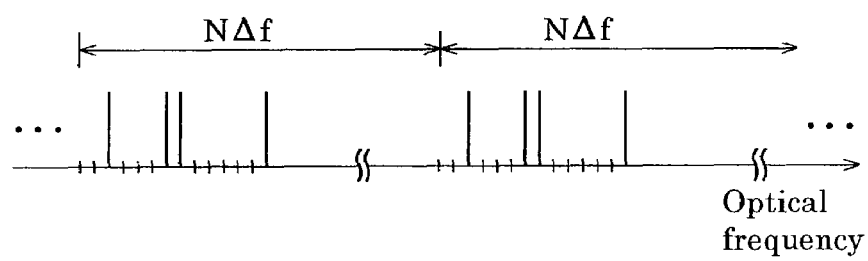
Figure 2D:
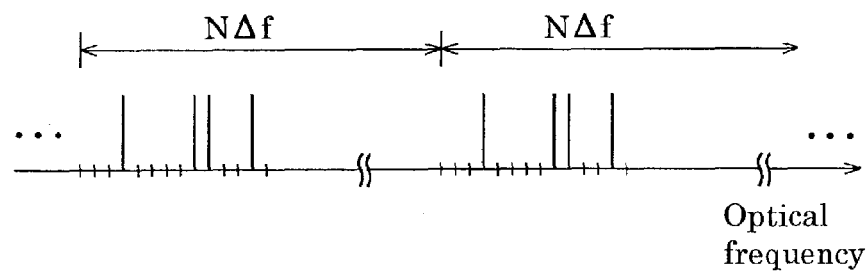

FIGS. 2A to 2D are graphs illustrating the optical frequencies of wavelength components in signal light which is transmitted through each of optical fiber transmission lines in the optical transmission system 1 shown in FIG. 1. FIG. 2A shows an arrangement of optical frequencies of signal light which is transmitted through the optical fiber transmission line 2. FIGS. 2B to 2D show arrangements of optical frequencies of wavelength components in signal light which is transmitted through each of the optical fiber transmission lines $5_1$ to $5_3$. In each of FIGS. 2A to 2D, the axis of abscissa indicates the optical frequency, and each line extending upwardly with respect to the axis of abscissa indicates a position in which each wavelength component of signal light is arranged.

As shown in FIG. 2A, the optical frequencies of wavelength components in each signal light which is input to the input port of the optical demultiplexer 3 through the optical fiber transmission line 2 are arranged on a grid having interval Δf. As shown in FIG. 2B, the optical frequencies of wavelength components in a demultiplexed signal light which is output from a first output port of the optical demultiplexer 3 to the optical amplifier $4_1$ are arranged having a constant period NΔf, where N represents an integer equal to 2 or greater.

Among the demultiplexed signal light which is output from the first output port of the optical demultiplexer 3 to the optical amplifier $4_1$, any three wavelength components that satisfy the following conditions:

$$f_a < f_b < f_d \quad (1a); \text{and}$$

$$f_d - f_a \leq N\Delta f \quad (1b)$$

have the following relationship:

$$2f_b \neq f_a + f_d \quad (2)$$

where $f_a$, $f_b$, and $f_d$ represent the optical frequencies of the three wavelength components, respectively. In other words, optical frequencies $f_a$ and $f_d$ are not symmetrically positioned with respect to optical frequency $f_b$. This applies to signal lights which are output from the other output ports of the optical demultiplexer 3 to the optical amplifiers $4_2$ to $4_M$ (See FIGS. 2C and 2D).

Alternatively, among the demultiplexed signal light which is output from the first output port to the optical amplifier $4_1$, any four wavelength components that satisfy the following conditions:

$$f_a < f_b < f_c < f_d \quad (3a); \text{and}$$

$$f_d - f_a \leq N\Delta f \quad (3b)$$

have the following relationship:

$$f_b + f_c \neq f_a + f_d \quad (4)$$

where $f_a$, $f_b$, $f_c$, and $f_d$ represent the optical frequencies of the four wavelength components, respectively. In other words, a pair of the optical frequencies $f_a$ and $f_b$ and a pair of the optical frequencies $f_c$ and $f_d$ have no mirror-image relationship to each other.

Figure 3:
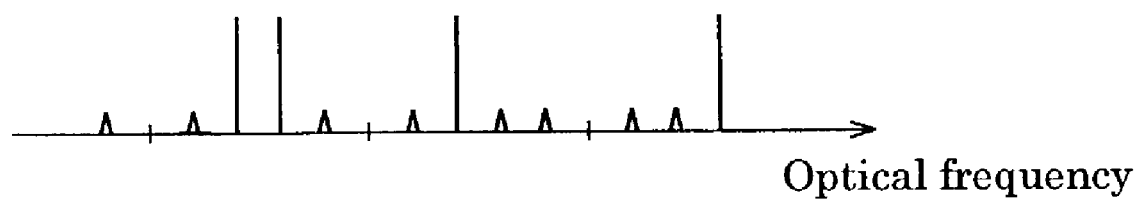
FIG. 3 is a graph illustrating the optical frequencies of wavelength components in signal light and four-wave mixed light on an optical fiber transmission line $5_1$ in the optical transmission system 1.

FIG. 3 illustrates the optical frequencies of each wavelength component in signal light and four-wave mixed light on an optical fiber transmission line $5_1$ in the optical transmission system 1 shown in FIG. 1. In FIG. 3, the axis of abscissa indicates the optical frequency, long lines extending upward with respect to the axis of abscissa indicate optical frequencies of wavelength components in signal light, and short lines extending upward indicate optical frequencies at which four-wave mixed light appears. Since the optical frequencies of the demultiplexed wavelength components in the signal light output from the first output port of the optical demultiplexer 3 are arranged so as to satisfy Expressions (1a) to (2), or so as to satisfy Expressions (3a) to (4), the optical frequency of light caused by four-wave mixing does not coincide with the optical frequency of any wavelength component in signal light on the optical fiber transmission line $5_1$, as shown in FIG. 3. This applies to signal light output from the other output ports of the optical demultiplexer 3 to the optical amplifiers $4_2$ to $4_M$.

As described above, according to the optical transmission system 1, the optical frequencies of wavelength components in signal lights are arranged so as to satisfy Expressions (1a) to (2), or so as to satisfy Expressions (3a) to (4), whereby, on each optical fiber transmission line $5_m$ from each output port of the optical demultiplexer 3 to each user-side apparatus $6_m$, the effect of four-wave mixing is reduced and a plurality of wavelength components in signal light can be transmitted to each user-side apparatus $6_m$. In addition, because the optical frequencies of the demultiplexed signal light which is output from the each output port of the optical demultiplexer 3 to the optical amplifiers $4_m$ are arranged having a constant period NΔf, in each user-side apparatus $6_m$, all signal components appearing in the period NΔf can be demultiplexed by using a filter having periodic characteristics, so the apparatus structure is simplified. The optical demultiplexer 3 can be constituted only by passive optical parts. Thus, its structure is simplified and it easily corresponds to a system change. As described above, the optical transmission system 1 according to this embodiment has good usability of optical frequencies and ease in system change.

It is preferable that, in each optical fiber transmission line $5_m$ connected to each output port of the optical demultiplexer 3, the absolute value of chromatic dispersion in signal light wavelength be equal to or less than 5 ps/nm/km. The absolute value of chromatic dispersion in signal light wavelength in the optical fiber transmission line $5_m$ that is equal to or less than 5 ps/nm/km eliminates the need for providing the user-side apparatus $6_m$ with a dispersion compensator, thus forming an inexpensive system.

Figure 4A:
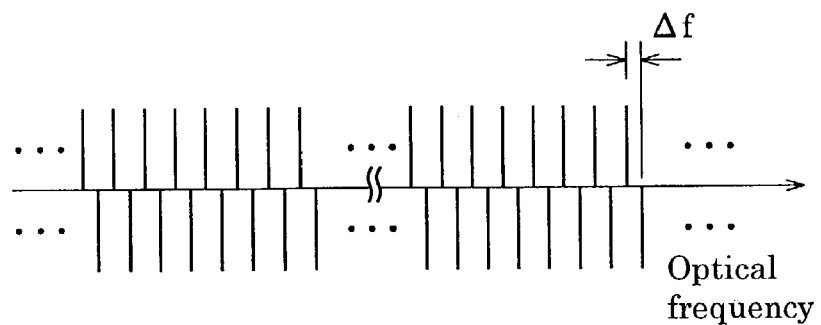
FIGS. 4A to 4C are graphs illustrating another arrangement of optical frequencies of wavelength components in signal light transmitted on each optical fiber transmission line in the optical transmission system.
Figure 4B:
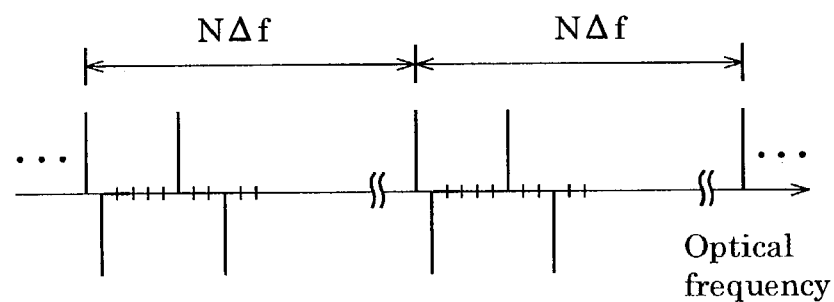
Figure 4C:
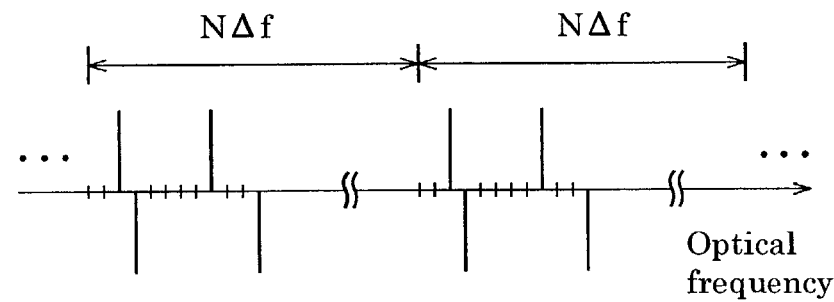

FIGS. 4A to 4C illustrate another arrangement of optical frequencies of wavelength components in signal light transmitted on the optical fiber transmission lines in the optical transmission system 1 shown in FIG. 1. FIG. 4A shows an arrangement of optical frequencies of signal light which has a plurality of wavelength components and which is transmitted through the optical fiber transmission line 2. FIGS. 4B and 4C show arrangements of optical frequencies of wavelength components in signal light transmitted through the optical fibers $5_1$ and $5_2$. In each of FIGS. 4A to 4C, the axis of abscissa indicates the optical frequency, and each line which extends upward or downward indicates a position in which an optical frequency of wavelength component in signal light is positioned. The signal light indicated by each upwardly extending line and the signal light indicated by each downwardly extending line have orthogonal polarization to each other.

As shown in FIG. 4A, the optical frequencies of wavelength components in signal light which are transmitted through the optical fiber transmission line 2 and are input to the input port of the optical demultiplexer 3 are arranged on a grid having each regular frequency interval Δf. Among the wavelength components in the signal light, any two wavelength components having adjacent optical frequencies have orthogonal polarization to each other.

As shown in FIG. 4B, the optical frequencies of the demultiplexed signal light which are output from the first output port of the optical demultiplexer 3 to the optical amplifier $4_1$ are arranged having a constant period NΔf. Among the demultiplexed signal light output from the first output port of the optical demultiplexer 3 to the optical amplifier $4_1$, when the optical frequencies of any three wavelength components that satisfy Expression (1) are represented by $f_a$, $f_b$, and $f_d$, respectively, these optical frequencies satisfy Expression (2), and the optical frequencies $f_a$ and $f_d$ are not symmetrical in position with respect to the optical frequency $f_b$. Among the demultiplexed signal light output from the first output port of the optical demultiplexer 3 to the optical amplifier $4_1$, when the optical frequencies of any four wavelength components that satisfy Expression (3) are represented by $f_a$, $f_b$, $f_c$, and $f_d$, respectively, these optical frequencies satisfy Expression (4), and a pair of the optical frequencies $f_a$ and $f_b$ and a pair of the optical frequencies $f_c$ and $f_d$ do not have any mirror relationship to each other. In addition, among the demultiplexed signal light which are output from each output port of the optical demultiplexer 3, any two wavelength components having adjacent optical frequencies have orthogonal polarization to each other. This applies to the signal lights output from the other output ports of the optical demultiplexer 3 to the optical amplifiers $4_2$ to $4_M$, as shown in FIG. 4C.

When the arrangement of optical frequencies of wavelength components in signal light and polarization states thereof are set in a state such as described above, the optical transmission system 1 not only produces the above-described advantages, but also prevents four-wave mixing itself from occurring. Therefore, in the optical transmission system 1, multiplexing can be performed at higher density.

Exemplifying Embodiment 1

Figure 5:
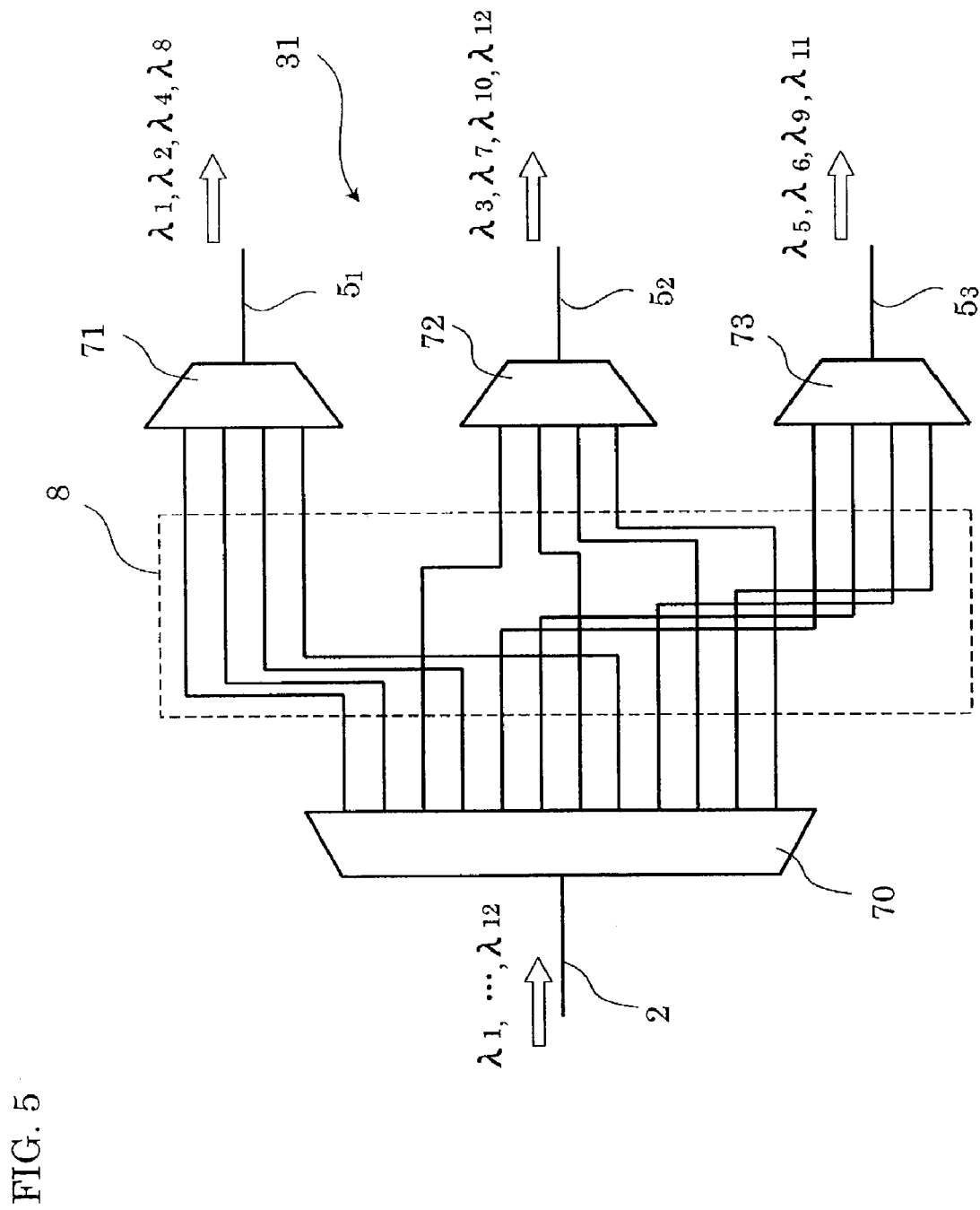
FIG. 5 is a block diagram showing an embodiment of an optical demultiplexer of the present invention.

FIG. 5 shows the specific structure of an optical demultiplexer 31 for use in Embodiment 1. The optical demultiplexer 31 comprises four arrayed waveguide gratings (AWGs) 70 to 73 for multiplexing and demultiplexing light each of whose wavelength intervals is Δf and optical fibers for connecting them.

Twelve wavelength ($\lambda_1$ to $\lambda_{12}$) components arranged at each frequency interval Δf and constituting signal light transmitted through an optical fiber transmission line 2 are demultiplexed by the AWG 70 into twelve signal lights of wavelengths $\lambda_1$ to $\lambda_{12}$. Four signal lights of wavelengths $\lambda_1$, $\lambda_2$, $\lambda_4$, and $\lambda_8$ are multiplexed by the AWG 71 into signal light having four wavelength components, and the multiplexed signal light is transmitted to an optical fiber transmission line $5_1$. Similarly, signal lights of wavelengths $\lambda_3$, $\lambda_7$, $\lambda_{10}$, and $\lambda_{12}$ are multiplexed by the AWG 72 into signal light to be transmitted to an optical fiber transmission line $5_2$. Signal lights of wavelengths $\lambda_5$, $\lambda_6$, $\lambda_9$, and $\lambda_{11}$ are multiplexed by the AWG 73 to be transmitted to an optical fiber transmission line $5_3$. The signal lights having four wavelength components and transmitted to the optical fiber transmission lines $5_1$, $5_2$, and $5_3$ satisfy the conditions represented by Expressions (1a) to (4), respectively.

In the case of controlling wavelength assignment, the portion denoted by reference numeral 8 in FIG. 5 may be replaced by a 12×12 optical cross connector.

Exemplifying Embodiment 2

Figure 6:
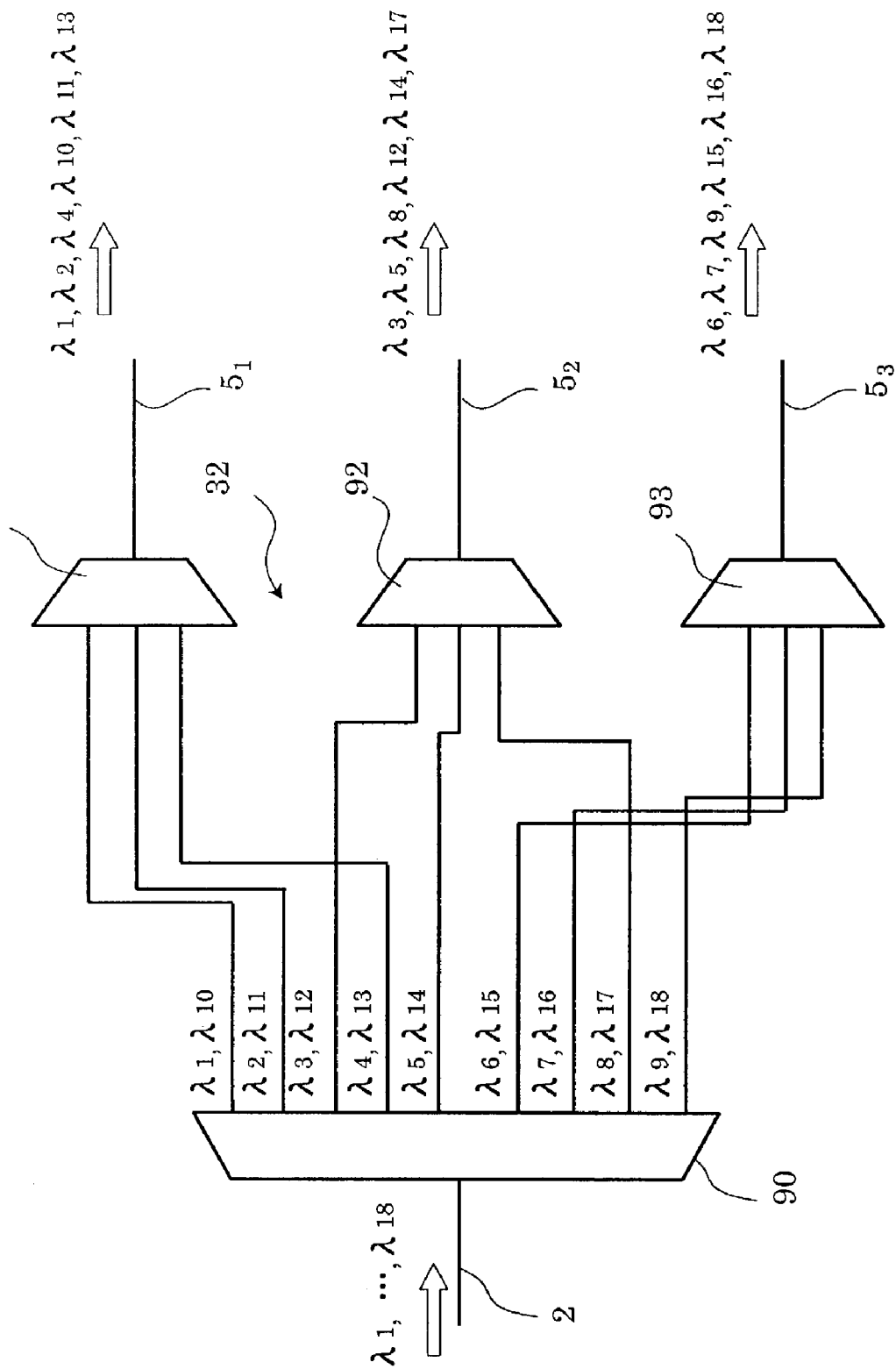
FIG. 6 is a block diagram showing another embodiment of the optical demultiplexer of the present invention.

FIG. 6 shows the specific structure of an optical demultiplexer 32 for use in Embodiment 2. The optical demultiplexer 32 includes four AWGs 90 to 93 each having a period 9×Δf. Eighteen wavelength ($\lambda_1$ to $\lambda_{18}$) components constituting signal light transmitted through an optical fiber 2 and sequentially arranged at each frequency interval Δf are demultiplexed by an AWG 90 into nine signal lights having pairs of wavelengths $\lambda_1$ and $\lambda_{10}$, $\lambda_2$ and $\lambda_{11}$, . . . , $\lambda_9$ and $\lambda_{18}$. Six signal light wavelength components of $\lambda_1$, $\lambda_2$, $\lambda_4$, $\lambda_{10}$, $\lambda_{11}$, and $\lambda_{13}$ are multiplexed by an AWG 91 into signal light having six wavelength components, and the multiplexed signal light is transmitted to an optical fiber transmission line $5_1$. Similarly, signal light wavelength components of $\lambda_3$, $\lambda_5$, $\lambda_8$, $\lambda_{12}$, $\lambda_{14}$, and $\lambda_{17}$ are multiplexed by an AWG 92 to be transmitted to an optical fiber $5_2$. Signal light wavelength components of $\lambda_6$, $\lambda_7$, $\lambda_9$, $\lambda_{15}$, $\lambda_{16}$, and $\lambda_{18}$ are multiplexed by an AWG 93 to be transmitted to an optical fiber 53.

The signal lights which each have six wavelength components and which are transmitted to the optical fibers $5_1$, $5_2$, and $5_3$ satisfy the conditions represented by Expressions (1a) to (4). Each signal light has the period 9×Δf.

The present invention is not limited to the above embodiments, but can be modified variously. For example, instead of providing an optical amplifier after the stage of the optical demultiplexer 3, the optical amplifier may be provided before the stage of the optical demultiplexer 3.

The entire disclosure of Japanese Patent Application No. 2002-105365 filed on Apr. 8, 2002 including a specification, claims, drawings, and a summary are incorporated herein by reference in its entirety.

What is claimed is:

1. An optical demultiplexer for demultiplexing an input signal light input from an input port and outputting demultiplexed signal lights from a plurality of output ports, said input signal light including a plurality of wavelength components arranged at predetermined frequency intervals, wherein, among wavelength components in each demultiplexed signal light output from each of said plurality of output ports, any three wavelength components having optical frequencies of $f_a$, $f_b$, and $f_d$ that satisfy the following conditions:

$$f_a < f_b < f_d; \text{ and}$$

$$f_d - f_a < N\Delta f$$

have the following relationship:

$$2f_b \neq f_a + f_d$$

where N represents an integer and $\Delta f$ represents the predetermined frequency intervals.

2. An optical demultiplexer according to claim 1, wherein the optical frequencies of the wavelength components in each of the output signal lights are arranged periodically with a cycle of $N\Delta f$, where N represents an integer equal to or greater than 2.

3. An optical demultiplexer according to claim 1, wherein:
among wavelength components in the input signal light, the polarization of any two wavelength components having adjacent optical frequencies is orthogonal to each other; and
among the wavelength components in the output signal lights, the polarization of any two wavelength components having adjacent optical frequencies is orthogonal to each other.

4. An optical transmission system comprising:
an optical demultiplexer as defined in claim 1;
an input-side optical transmission line connected to an input port of said optical demultiplexer; and
output-side optical transmission lines respectively connected to output ports of said optical demultiplexer.

5. An optical transmission system according to claim 4, wherein the absolute value of chromatic dispersion in signal light wavelengths on each of the output-side optical transmission lines is equal to or less than 5 ps/nm/km.

6. An optical transmission system according to claim 4, further comprising an optical amplifier for amplifying either of the input signal light or the demultiplexed signal lights output from the plurality of output ports.

7. An optical demultiplexer according to claim 1,
said optical demultiplexer comprising a preliminary demultiplexer and multiplexers,
wherein said preliminary demultiplexer demultiplexes the input signal light and outputs intermediate lights, each of which includes one wavelength component or a plurality of wavelength components which are on a grid having a frequency interval of $N\Delta f$ and each of said multiplexers multiplexes said intermediate lights and outputs the demultiplexed signal light.

8. An optical demultiplexer for demultiplexing an input signal light input from an input port and outputting demultiplexed signal lights from a plurality of output ports, said input signal light including a plurality of wavelength components arranged at predetermined frequency intervals, wherein, among wavelength components in each demultiplexed signal light output from each of said plurality of output ports, any four wavelength components having optical frequencies of $f_a$, $f_b$, $f_c$, and $f_d$ that satisfy the following conditions:

$$f_a < f_b < f_c < f_d; \text{ and}$$

$$f_d - f_a \leq N\Delta f$$

have the following relationship:

$$f_b + f_c \neq f_a + f_d$$

where N represents an integer and $\Delta f$ represents the predetermined frequency intervals.

9. An optical demultiplexer according to claims 8, wherein the optical frequencies of the wavelength components in each of the output signal lights are arranged periodically with a cycle of $N\Delta f$, where N represents an integer equal to or greater than 2.

10. An optical demultiplexer according to claim 8, wherein:
among wavelength components in the input signal light, the polarization of any two wavelength components having adjacent optical frequencies is orthogonal to each other; and
among the wavelength components in the output signal lights, the polarization of any two wavelength, components having adjacent optical frequencies is orthogonal to each other.

11. An optical transmission system comprising:
an optical demultiplexer as defined in claims 8;
an input-side optical transmission line connected to an input port of said optical demultiplexer; and
output-side optical transmission lines respectively connected to output ports of said optical demultiplexer.

12. An optical transmission system according to claim 11, wherein the absolute value of chromatic dispersion in signal light wavelengths on each of the output-side optical transmission lines is equal to or less than 5 ps/nm/km.

13. An optical transmission system according to claim 11, further comprising an optical amplifier for amplifying either of the input signal light or the demultiplexed signal lights output from the plurality of output ports.

14. An optical demultiplexer according to claim 8,
said optical demultiplexer comprising a preliminary demultiplexer and multiplexers,
wherein said preliminary demultiplexer demultiplexes the input signal light and outputs intermediate lights, each of which includes one wavelength component or a plurality of wavelength components which are on a grid having a frequency interval of $N\Delta f$ and each of said multiplexers multiplexes said intermediate lights and outputs the demultiplexed signal light.

* * * * *